United States Patent [19]

Price

[11] Patent Number: 5,018,591

[45] Date of Patent: May 28, 1991

[54] TRACK LAYING WORK VEHICLE

[75] Inventor: Robert J. Price, Dunlap, Ill.

[73] Assignee: Caterpillar Inc., Peoria, Ill.

[21] Appl. No.: 513,746

[22] Filed: Apr. 24, 1990

[51] Int. Cl.$^5$ .................. B62D 55/00; B62D 55/08
[52] U.S. Cl. ............................ 180/9.5; 180/9.48;
180/906; 305/56
[58] Field of Search ............... 180/9.5, 9.48, 9.6,
180/9.62, 906; 305/56

[56] References Cited

U.S. PATENT DOCUMENTS

| 1,429,475 | 9/1922 | Wickersham | 180/9.5 |
|---|---|---|---|
| 2,049,672 | 8/1936 | Starr | 305/60 |
| 2,535,762 | 12/1950 | Tapp et al. | 180/340 |
| 2,588,333 | 3/1952 | Wilson | 180/9.6 |
| 2,618,349 | 11/1952 | Ludema | 180/9.48 |
| 2,681,231 | 6/1954 | Kondracki | 180/9.48 |
| 2,911,229 | 11/1959 | Strehlow | 280/96 |
| 2,988,159 | 6/1961 | Weber | 180/9.5 |
| 3,357,752 | 12/1967 | Ruf | 305/56 |
| 3,583,509 | 6/1971 | Stachnik | 180/9.5 |
| 3,664,449 | 5/1972 | Vardell | 180/9.48 |
| 3,907,055 | 9/1975 | Bertram et al. | 180/9.48 |
| 4,341,276 | 7/1982 | Furuichi | 180/9.48 |
| 4,349,234 | 9/1982 | Hartmann | 305/56 |
| 4,425,008 | 1/1984 | Weeks | 305/56 |
| 4,817,746 | 4/1989 | Purcell et al. | 180/9.1 |
| 4,834,478 | 5/1989 | Stevens et al. | 305/21 |
| 4,836,318 | 6/1989 | Tonsor et al. | 180/9.5 |
| 4,838,373 | 6/1989 | Price et al. | 180/9.46 |

Primary Examiner—Mitchel J. Hill
Attorney, Agent, or Firm—Claude F. White

[57] ABSTRACT

A track laying work vehicle has an undercarriage assembly including a rigid support beam and first and second roller frame assemblies, one on either side of the vehicle. Each roller frame assembly has first and second end portions and supports a rotatable idler wheel assembly at the first end portion and a powered drive wheel at the second end portion. Each drive wheel is frictionally engaged with a drive axle of the vehicle and can be engaged with the drive axle at a plurality of lateral positions on the axle. The first end portion of each roller frame assembly is releasably connected to one end of the support beam and is laterally moveable on the support beam. An endless track, such as an elastomeric belt, encircles a respective drive wheel, roller frame assembly, and idler wheel assembly on each side of the vehicle. By moving the track roller frame assembly and drive wheel laterally along the drive axle and support beam respectively, various gage settings of the endless track are provided.

22 Claims, 8 Drawing Sheets

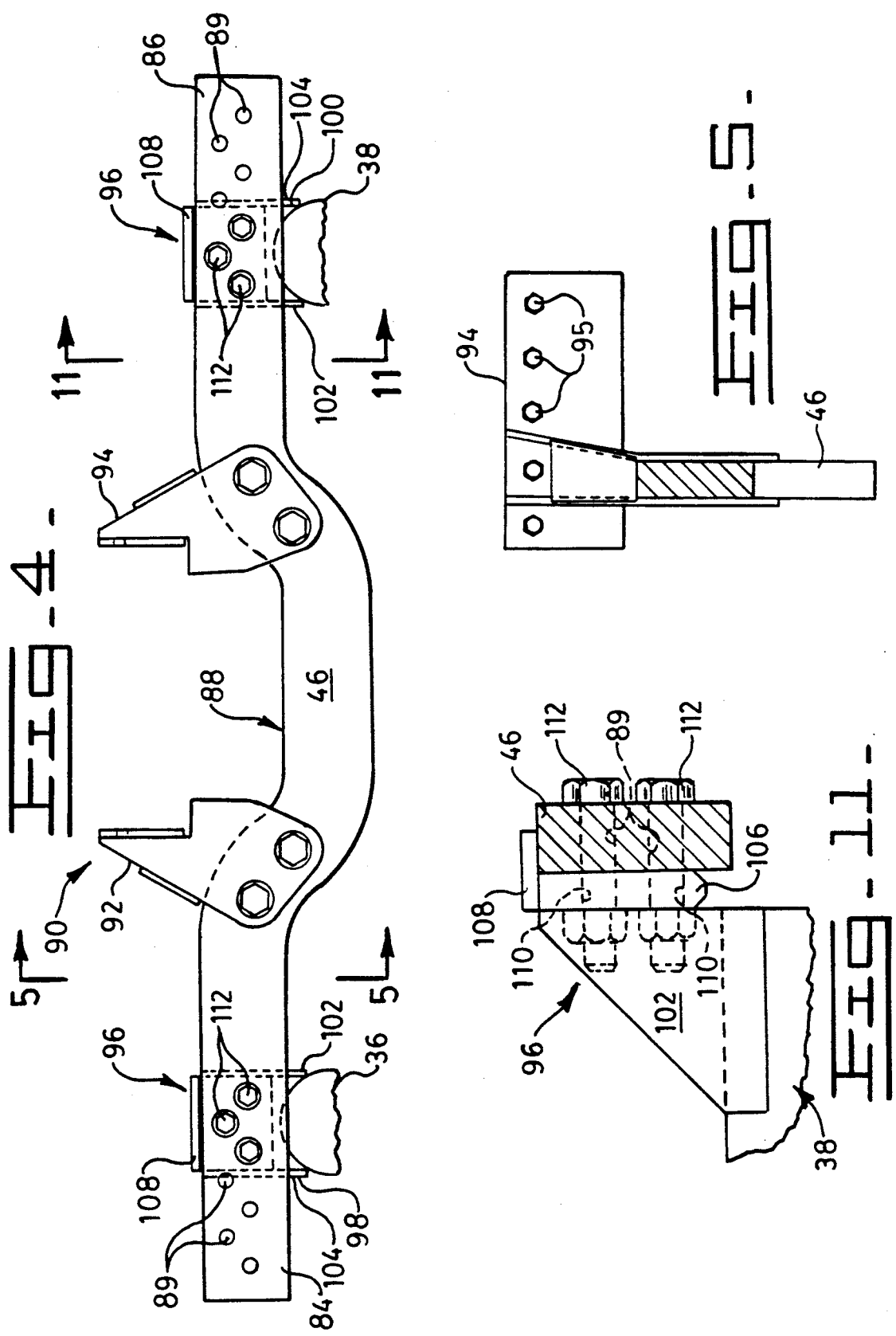

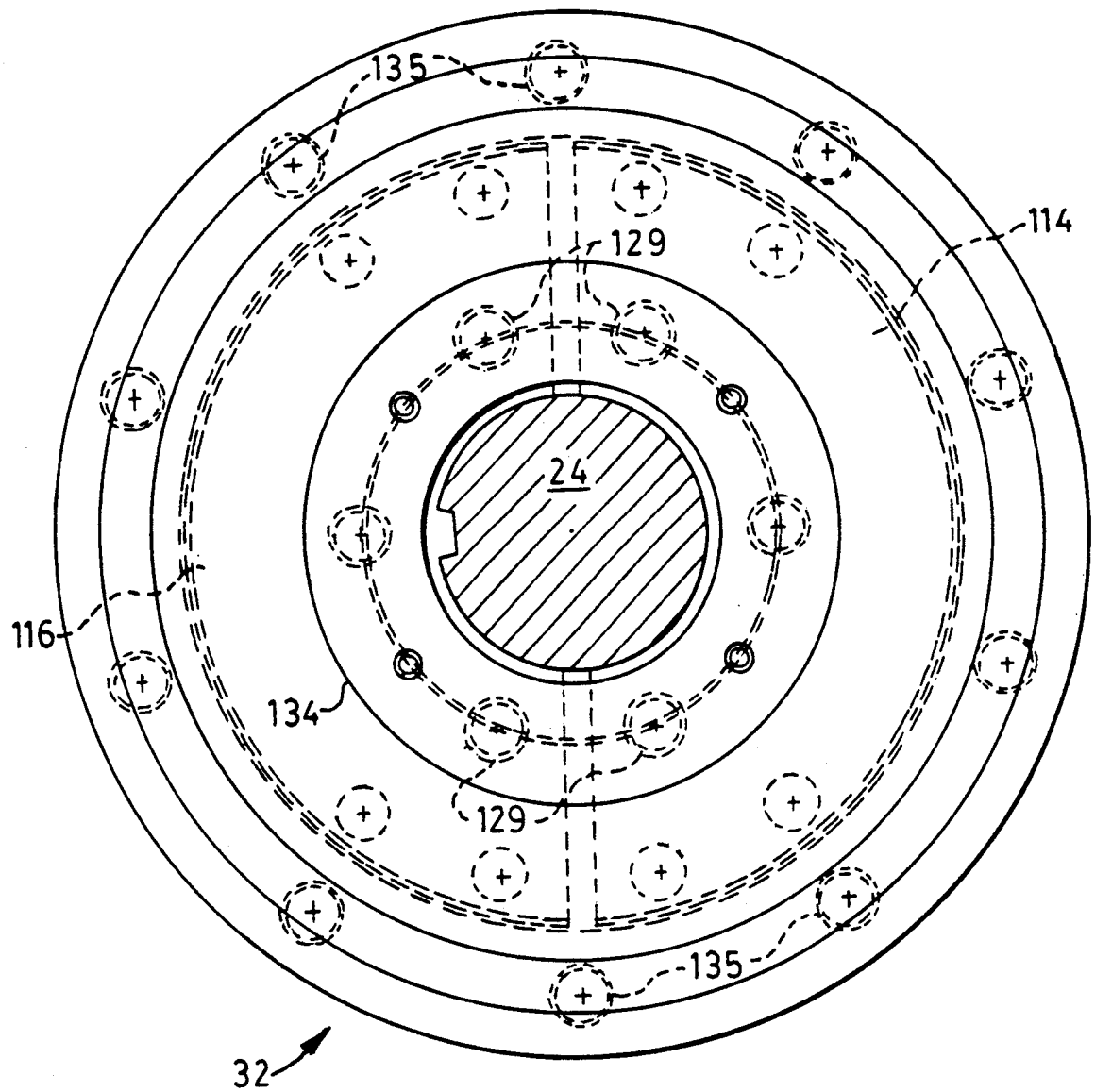
Fig_7_

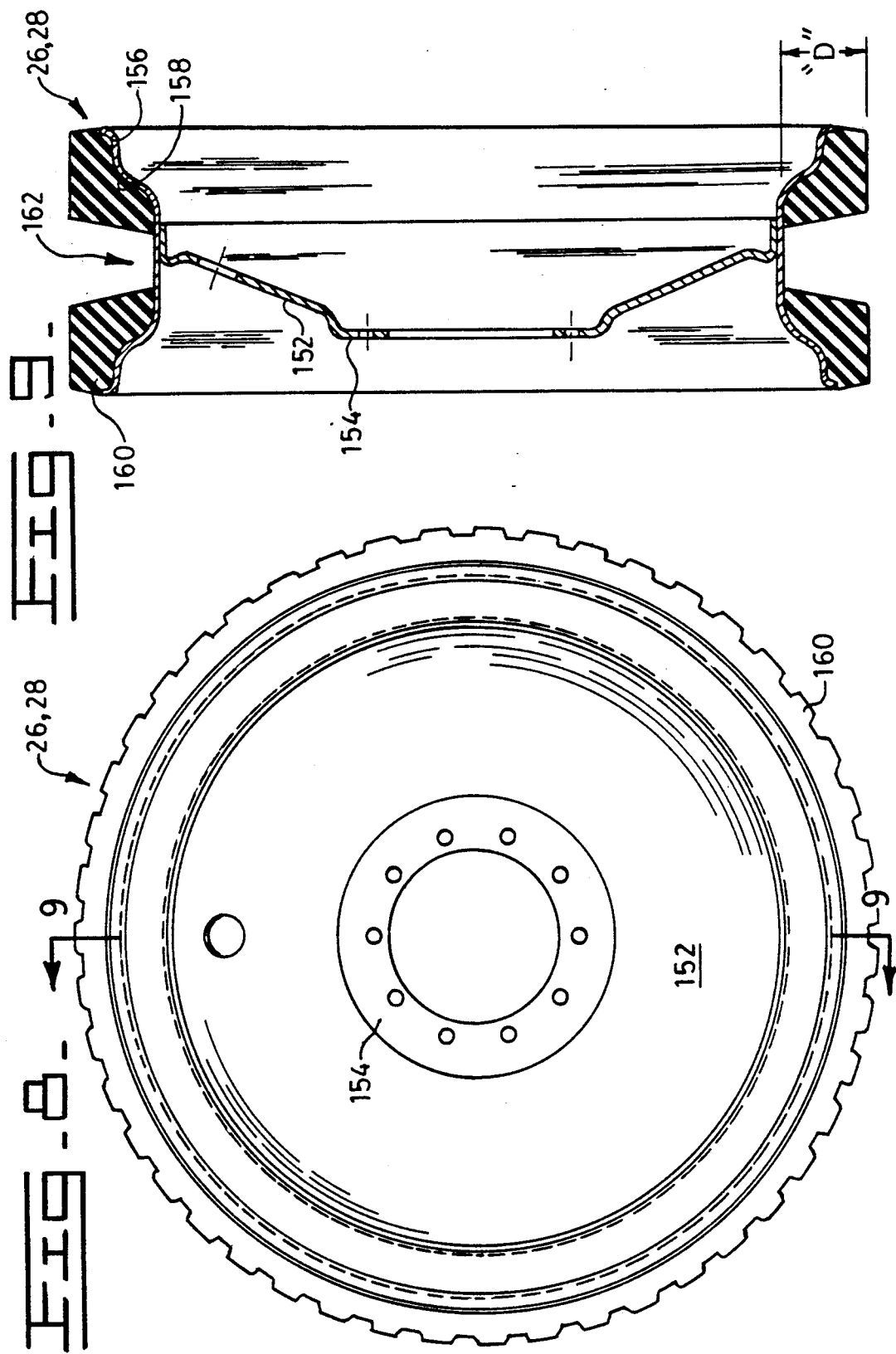

TRACK LAYING WORK VEHICLE

TECHNICAL FIELD

This invention relates generally to track laying work vehicles and more particularly to roller frame assemblies for such vehicles which support the vehicle, a plurality of belt guiding rollers, and the idler wheels.

BACKGROUND ART

Construction, earthmoving, and agricultural type work vehicles are often equipped with endless self-laying track chain assemblies for support and propulsion of the vehicle. Such prior art track type vehicles, utilizing metal track chain assemblies, are generally low speed vehicles and work in environments not requiring relatively high ground clearance beneath the vehicle. More recently, work vehicles having endless, inextensible elastomeric track belts have been employed to perform work tasks previously accomplished by metal track equipped vehicles. The elastomeric track belt vehicles have many advantages over metal track vehicles and also over wheel type vehicles. Some of these advantages include less weight and maintenance, lower soil compaction, and the ability to travel on improved roadways.

One type of belted vehicle is disclosed in U.S. Pat. No. 4,817,746 issued to R. J. Purcell et al. on Apr. 4, 1989. In this patent, each of the endless elastomeric belts is driven by a pair of elevated drive wheels and is guided and supported by a pair of large diameter idler wheels and a plurality of smaller diameter roller assemblies. The idler wheels and roller assemblies are supported and suspended by a plurality of links, levers, and fluid cylinders. This large number of components in the undercarriage and suspension adds complexity, weight, and cost to the vehicle.

Another type of belted vehicle having a track roller frame assembly is disclosed in U.S. Pat. No. 4,836,318 issued to A. J. Tonsor et al. on June 6, 1989. This patent discloses a vehicle having a track roller frame which is connected to the front of the vehicle by a pivot joint, and is connected to the rear of the vehicle by a collar which extends between the two drive wheels. The track roller frame also has an inside support device which connects the roller frame to the vehicle on the inside of the drive wheels. Although this type of suspension and track roller frame would appear to function satisfactorily for this particular type of vehicle, it is rather complex and limits the ground clearance under the vehicle. The roller frame supports between the drive wheels and to the inside of the drive wheels would also tend to collect dirt and debris.

The present invention is directed toward overcoming one or more of the problems as set forth above.

DISCLOSURE OF THE INVENTION

In one aspect of the present invention, a track laying work vehicle has a main frame assembly, an engine, and first and second drive axles connected to the engine. An undercarriage assembly supports the vehicle and provides propulsion to move the vehicle and provide work functions. The undercarriage assembly includes first and second auxiliary frame assemblies, one positioned on each side of the vehicle, first and second drive wheels, one connected to each drive axle, first and second idler wheel assemblies, a support beam connected to the vehicle main frame and to each auxiliary frame assembly, first and second roller frame extensions, and first and second endless track assemblies. Each roller frame extension connects one of the roller frames to one of the drive axles and each of the track assemblies encircles one of the auxiliary frame assemblies, one of the drive wheels, and one of the idler wheel assemblies. The undercarriage assembly further includes means for connecting the auxiliary frames to the support beam at a plurality of positions on the support beam.

Prior art vehicles utilized in agricultural operations are generally equipped with a plurality of wheels which support and propel the vehicle. The wheels provide high ground clearance for crop cultivation and are generally adjustable to accommodate various row crop spacings. Wheel type vehicles, however, tend to cause undesirable soil compaction and their use is somewhat limited in wet soil conditions. Track type vehicles provide greater traction in wet soil conditions and less soil compaction, but are limited in their ground clearance and the tracks cannot be adjusted to accommodate different row crop spacings.

The subject invention provides a tracked vehicle having high ground clearance and track assemblies which are laterally adjustable to a plurality of gage widths.

BRIEF DESCRIPTION OF THE DRAWINGS

FIG. 4 is a diagrammatic front elevational view of a support beam of the present invention;

FIG. 5 is a diagrammatic sectional view of the support beam, taken generally along lines 5—5 of FIG. 4;

FIG. 7 is a diagrammatic side elevational view, partly in section, and on an enlarged scale, of a portion of the clamp assembly shown in FIG. 6;

FIG. 8 is a diagrammatic side elevational view of a drive wheel assembly of the present invention;

FIG. 9 is a diagrammatic sectional view taken generally along the lines 9—9 of FIG. 8;

FIG. 11 is a diagrammatic sectional view of a connecting means of the present invention, taken generally along lines 11—11 of FIG. 4.

BEST MODE FOR CARRYING OUT THE INVENTION

Figure 1:
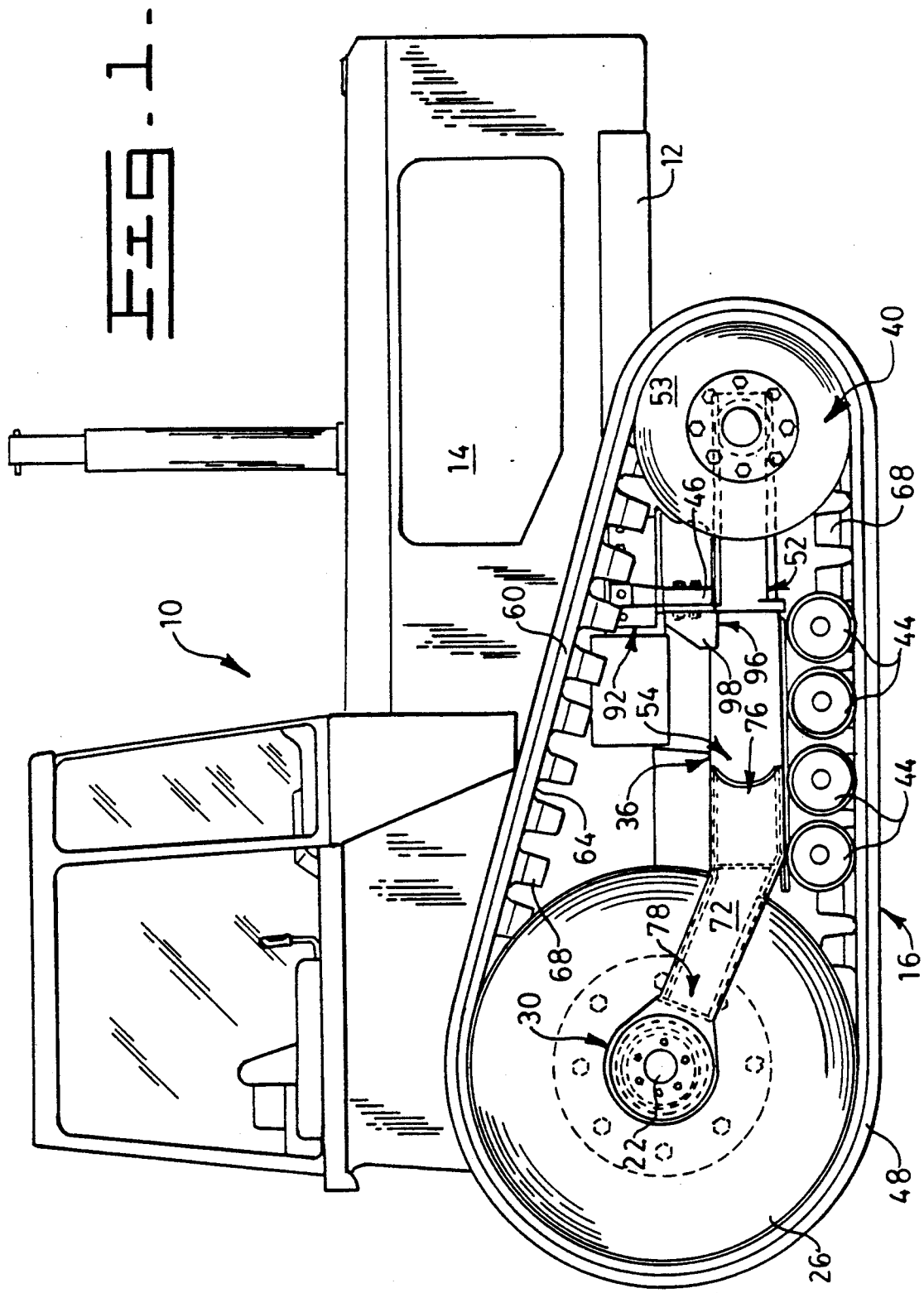
FIG. 1 is a diagrammatic side elevational view of a vehicle incorporating the subject invention.
Figure 2:
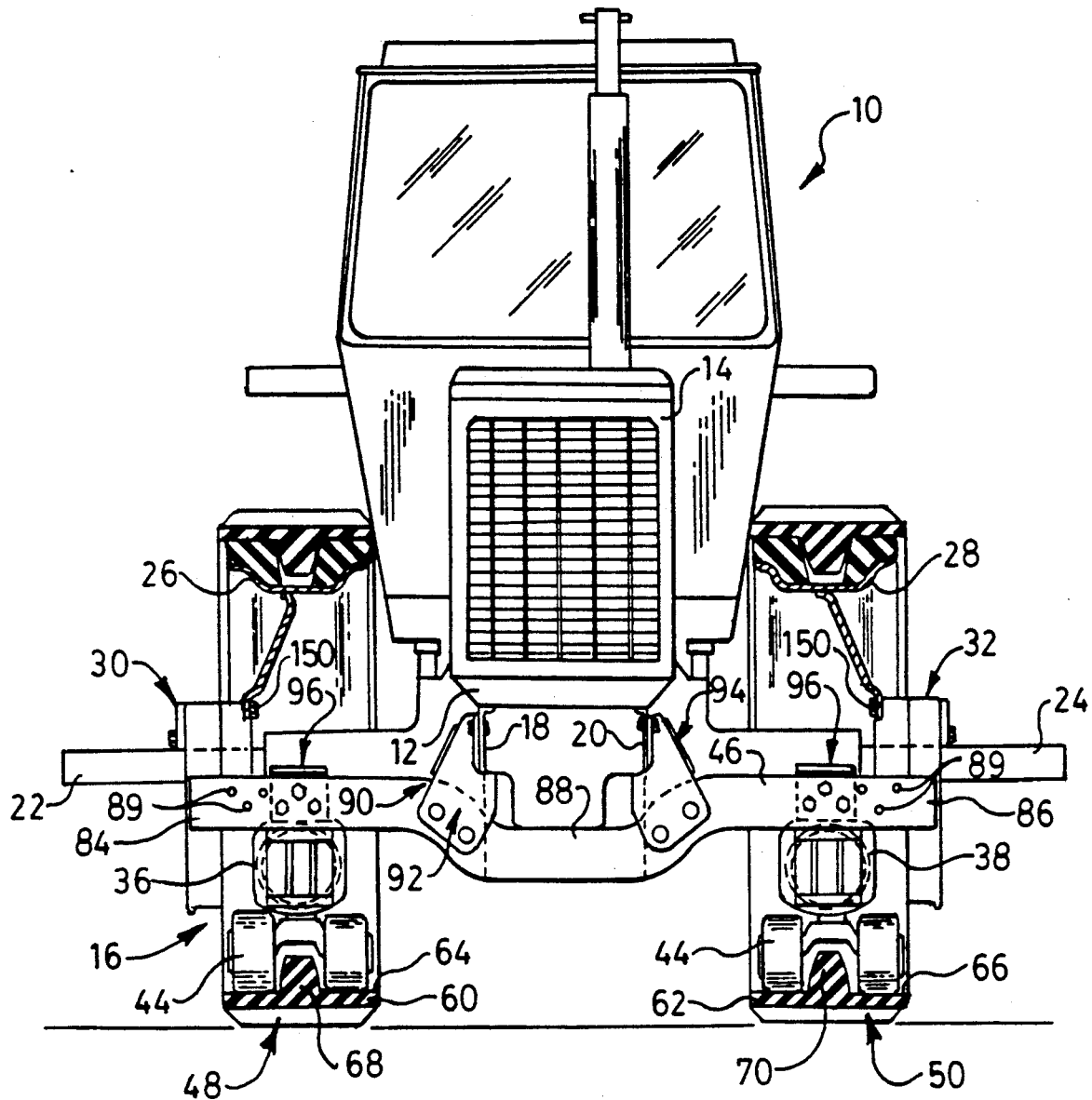
FIG. 2 is a diagrammatic front elevational view of the vehicle shown in FIG. 1.
Figure 3:
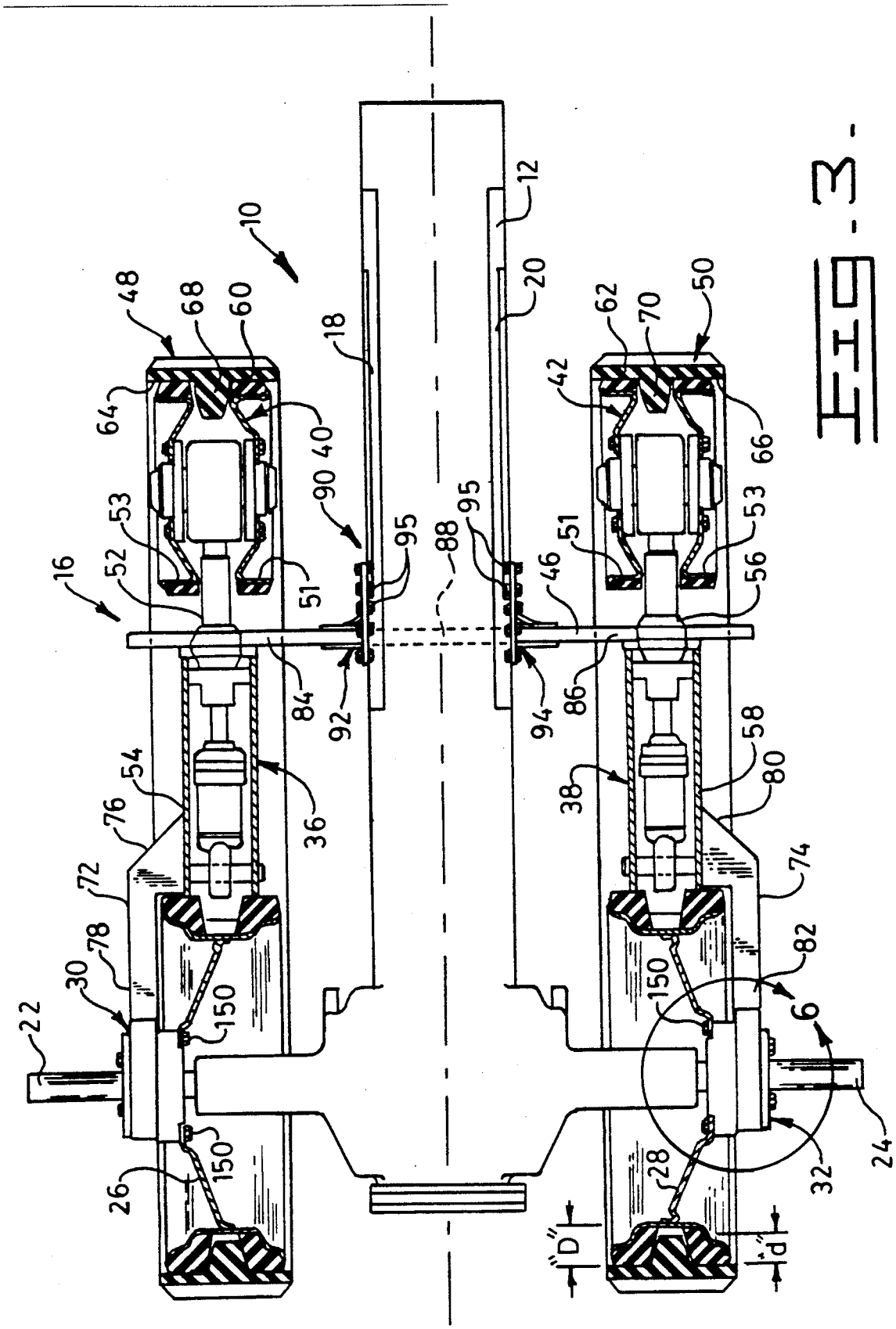
FIG. 3 is a diagrammatic bottom plan view, partly in section, of the vehicle shown in FIG. 1.

Referring to the drawings, a track laying work vehicle 10 has a main frame assembly 12, a power generating means such as an engine 14, and an undercarriage assembly 16. The main frame assembly 12 includes first and second opposed spaced apart parallel side portions 18, 20. First and second drive axles 22,24 are rotatably connected to and powered by the engine 14 through a transmission and other standard control mechanisms, which are well known in the art. First and second drive wheels 26,28 are rotatably connected respectively to the first and second drive axles 22,24 through first and second friction clamp assemblies 30,32. As will be explained in greater detail hereinafter, the clamp assemblies 30,32 are releasably connected to a respective drive axle 22,24 and the drive wheels 26,28 are connected to a respective clamp assembly 30,32.

The vehicle 10 is supported and propelled by the undercarriage assembly 16, which includes first and second auxiliary roller frame assemblies 36,38 first and second idler wheel assemblies 40,42, a plurality of guide rollers 44, a rigid roller frame support beam 46, and first and second endless track assemblies 48,50. Each idler wheel assembly includes first and second spaced apart idler wheels 51,53. Each of the track assemblies 48,50 encircles a respective one of the drive wheels 26,28, the roller frame assemblies 36,38, the guide rollers 44, and the idler wheel assemblies 40,42. The guide rollers 44 are rotatably connected to the roller frame assemblies 36,38. Each of the roller frame assemblies 36,38 has first and second end portions 52,54 and 56,58 respectively, and each roller frame assembly 36,38 is substantially parallel to each other and spaced from a respective main frame side portion 18,20. Each of the idler wheel assemblies 40,42 is rotatably connected to a respective first end portion 52,56 of the roller frame assemblies 36,38. In the preferred embodiment, the track assemblies 48,50 include endless elastomeric belts 60,62. Each belt 60,62 has a respective inner friction drive surface 64,66 and a plurality of guide blocks 68,70 bonded to, or integrally formed with the inner drive surfaces 64,66.

The undercarriage assembly 16 further includes first and second roller frame extensions, or arm members, 72,74 with each being connected between a respective clamp assembly 30,32 and a roller frame assembly 36,38. Each roller frame extension 72,74 has first and second end portions 76,78 and 80,82 respectively, with the first end portions 76,80 being connected to a respective second end portion 54,58 of the roller frame assemblies 36,38, and the second end portions 78,82 being connected to a respective drive axle 22,24 through the first and second clamp assemblies 30,32. These connections are the only connections between the second end portions of the roller frame assemblies 36,38 and the vehicle 10.

The support beam 46 has first and second end portions 84,86 and a middle portion 88. Each of the first and second end portions 84,86 has a plurality of first mounting holes 89 which are arranged in a preselected pattern. The middle portion 88 extends transverse to and beneath the main frame assembly 12 and is releasably connected to the first and second side portions 18,20 by a first means 90, including first and second hanger assemblies 92,94. The hanger assemblies 92,94 are removably connected to the main frame side portions 18,20 by a plurality of threaded fasteners 95. Each of the first and second end portions 84,86 of the support beam 46 are releasably connected by a second connecting means 96 to a respective first end portion 52,56 of the roller frame assemblies 36,38. The second connecting means 96 includes first and second bracket assemblies 98,100 which provide a plurality of connected positions between each end portion 84,86 of the support beam 46 and the respective roller frame assembly 36,38. The roller frame assemblies 36,38 are moveable along the respective support beam end portions 84,86 and are connectable at the different positions to provide a variable gage of the track assemblies 48,50.

With particular reference to FIGS. 1, 2, 4, and 11, each of the bracket assemblies 98,100 includes first and second parallel plates 102, 104, joined together by a third plate 106. A fourth plate 108 is joined to the top surface of the third plate 106. The third plate 106 has a plurality of second mounting holes 110 arranged in a second preselected pattern. Each plate 106 is removably connected to the support beam 46 by a plurality of threaded fasteners 112 which penetrate respective holes 89 in the support beam 46 and holes 110 in the plate 106. The bracket assemblies 98,100, and the attached roller frame assemblies 38,40, can be moved along the support beam 46 and connected to the support beam at a plurality of positions, wherever the second preselected pattern of holes in the plates 106 align with one of the first preselected patterns of holes in the support beam 46. Although the support beam 46 has been illustrated with a plurality of connecting and adjusting holes 89, these holes 89 could be replaced with a plurality of elongated slots. Such slots would provide even greater lateral adjusting capabilities.

Figure 6:
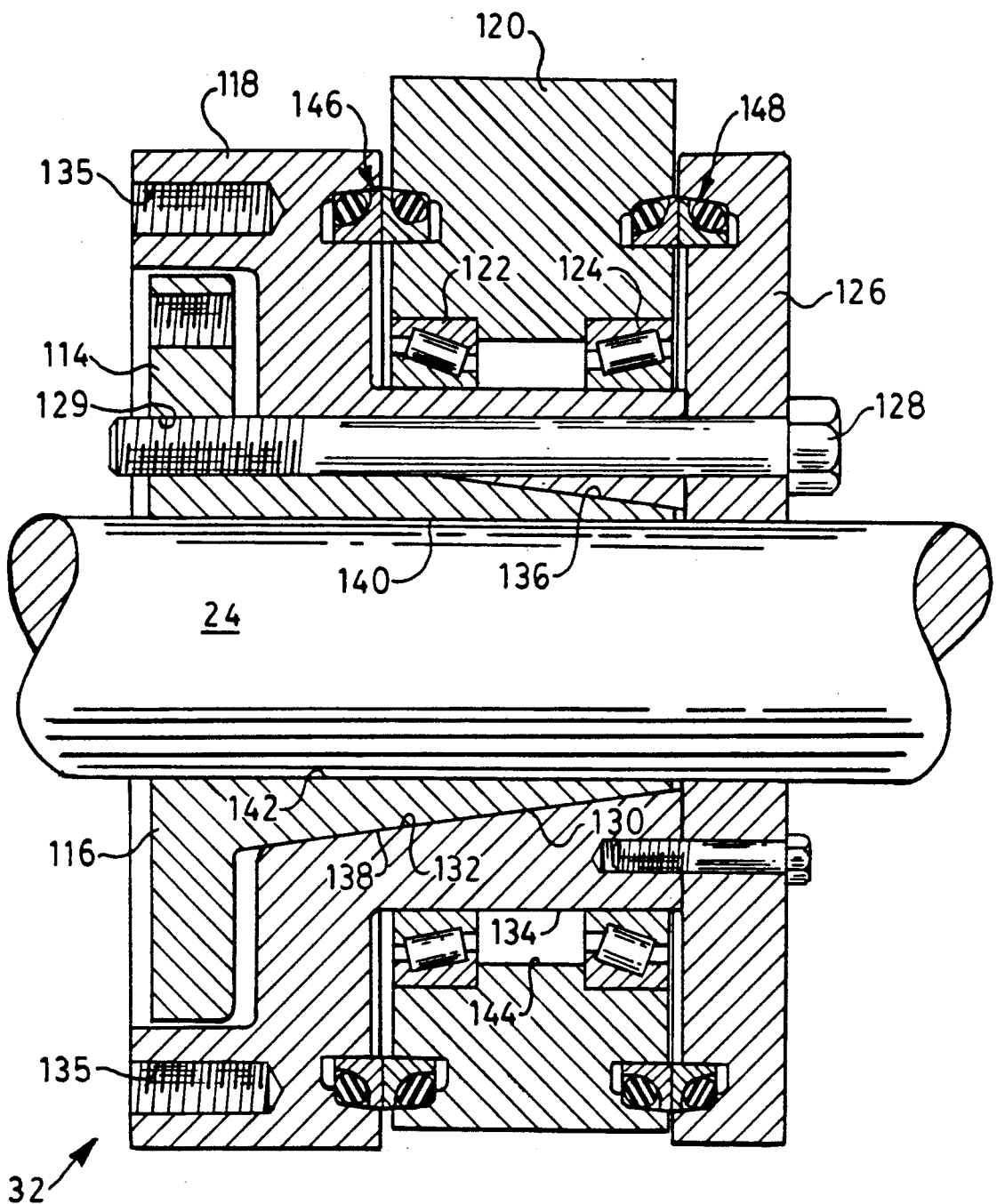
FIG. 6 is a diagrammatic sectional view, on an enlarged scale, of a clamp assembly of the present invention, taken in the circled area of FIG. 3.
Figure 10:
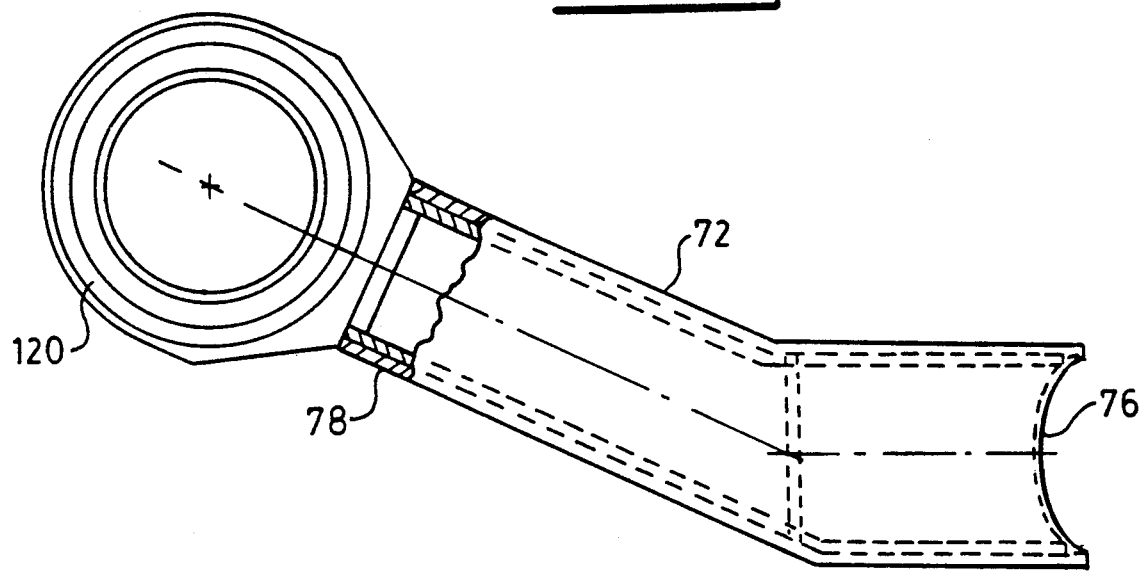
FIG. 10 is a diagrammatic side elevational view of a roller frame extension of the present invention.

With particular reference to FIGS. 3, 6, 7, and 10, the first and second clamp assemblies 30,32 are substantially identical, and therefore the specific description of the clamp assembly 32, shown in FIG. 6 will apply also to the clamp assembly 30. The clamp assembly 32 includes first and second wedge members 114,116, a hub member 118, a bearing cage 120, first and second bearing assemblies 122,124, a retainer plate 126, and means for connecting the various clamp members together, including a plurality of threaded fasteners 128. The threaded fasteners are adapted to mate with a plurality of threaded holes 129 in the wedge members 114,116. The hub member 118 has an internal cavity 130 having a tapered wall portion 132, and a journal portion 134 adapted to receive the inner races of the bearing assemblies 122,124. The hub member also has a plurality of threaded holes 135. The wedge members 114,116 have outer taper wall portions 136,138 respectively, which are adapted to mate with the tapered wall portion 132 of the hub member 118. The wedge members 114,116 also have inner wall surfaces 140,142 respectively, which are adapted to mate with and clamp onto the drive axle 24. When the clamp assemblies 30,32 are not securely clamped against the drive axles 22,24, they are laterally moveable along the axles 22,24. Since the drive wheels 26,28 are connected to the clamp assemblies 30,32, the drive wheels are also laterally moveable along the drive axles to vary the track gage. The bearing cage 120 has a stepped internal bore 144 which is adapted to receive the outer races of the bearing assemblies 122,124. The bearing assemblies 122,124 are therefore positioned between the bearing cage bore 144 and the hub member journal portion 134 and provide relative rotation between the hub member 120 and the other members of the clamp assembly 32. First and second seal assemblies 146,148 are positioned between the hub member 118 and the bearing cage 120 and between the retainer plate 126 and the bearing cage 120 respectively.

Each of the drive wheels 26,28 is rotatably connected to a respective drive axle through a respective clamp assembly 30,32. Each of the drive wheels 26,28 is connected to the hub member 118 by a plurality of threaded fasteners 150, which mate with the thread holes 135. With particular reference to FIGS. 1, 2, 3, 8, and 9, each of the drive wheels 26,28 includes a disc portion 152 having a mounting surface 154, and a rim portion 156 having an inwardly directed recess 158. The rim portion 156 has a layer of elastomeric material 160 bonded thereto which, with the recess 158, provides a deep recess 162 which has a preselected depth dimension "D". Each of the guide blocks 68,70 has a preselected height dimension "d" and the deep recess 160 is adapted to receive the guide blocks 68,70. The preselected dimensions of the recess 160 and the guide blocks 68,70 provide that depth dimension "D" is greater than height dimension "d". As can be seen from FIG. 1, the drive wheels 26,28 have a diameter which is larger than the diameter of the idler wheels 51,53. As is evident from FIG. 3, each of the drive wheels 26,28 is connected to a respective drive axle 22,24 at a position between the main frame and a respective roller frame extension 72,74.

Figure 12:
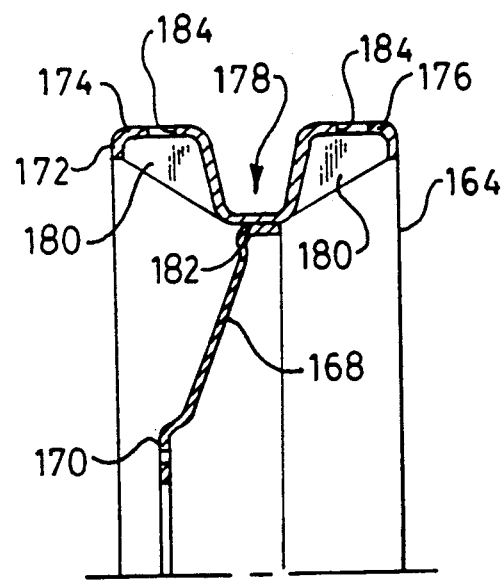
FIG. 12 is a diagrammatic partial sectional view of another embodiment of a drive wheel assembly of the present invention.
Figure 13:
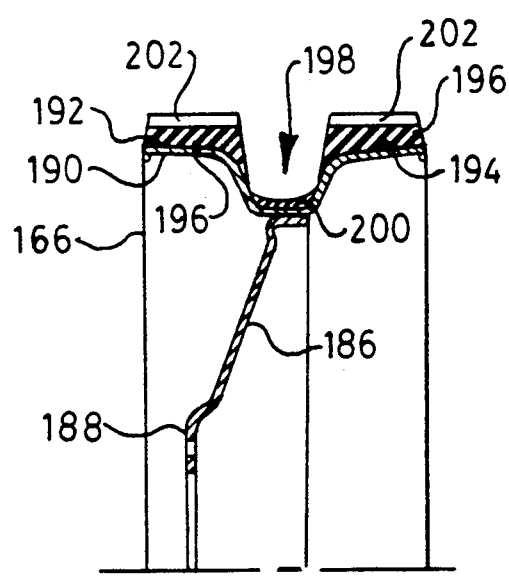
FIG. 13 is a diagrammatic partial sectional view of yet another embodiment of a drive wheel assembly of the present invention.

With particular reference to FIGS. 12 and 13, two other embodiments of one-piece drive wheels 164 and 166 are shown. Drive wheel 164 includes a disc portion 168 having a mounting surface 170, and a rim portion 172. The rim portion 172 has first and second spaced rim surfaces 174,176 which frictionally contact the elastomeric belts 60,62. A deep recess 178 is formed between the rim surfaces 174,176 to accommodate the guide blocks 68,70. The rim portion 172, including rim surfaces 174,176 are entirely metallic with the rim portion 172 being press formed or formed by casting. Spaced reinforcing ribs 180 can be provided to strengthen the rim surfaces 174,176. The disc portion 168 and the rim portion 172 are generally formed as individual members and are joined in any suitable manner at a joint 182. If desirable, spaced openings 184 can be provided in the rim surfaces 174,176 to create enhanced traction between the rim surfaces 174,176 and the inner drive surfaces 64,66 of the belts 60,62. These openings 184 will also allow foreign material to be expelled from the rim surfaces 174,176 and the drive surfaces 64,66.

Drive wheel 166 is similar to the drive wheels 26,28 and includes a disc portion 186 having a mounting surface 188, and a rim portion 190 having first and second rim surfaces 192,194. Each of the rim surfaces 192,194 has a layer of elastomeric material 196 bonded, or formed, thereon. A moderately deep recess 198 is formed between the rim surfaces 192,194 and, together with the layer of elastomeric material 196 forms a recess to accommodate the guide blocks 68,70. If desirable, a small layer of elastomeric material 200 can be provided at the base of the recess 198 to reduce packing of foreign material in the recess 198. The elastomeric material 196 is provided with spaced lugs or grousers 202 which enhance friction drive characteristics between the belts 60,62 and the drive wheel 166 by allowing foreign material to escape.

INDUSTRIAL APPLICABILITY

With reference to the drawings, the subject track laying vehicle 10 is particularly useful as an agricultural type work vehicle. It is advantageous that such a vehicle 10 have good traction, low ground pressure, low soil compaction, relatively high ground clearance, and have variable gage capabilities. The variable gage is especially useful for operating the vehicle in agricultural fields having different row crop spacings.

The vehicle 10 is supported and propelled by an undercarriage assembly 16 which includes first and second roller frame assemblies 36,38, first and second idler wheel assemblies 40,42, first and second drive wheels 26,28, and first and second endless elastomeric track assemblies 48,50. The idler wheel assemblies 40,42 are rotatably connected to the first end portions 52,56 of the roller frame assemblies 36,38 and the drive wheels 26,28 are rotatably connected to and powered by the drive axles 22,24. These connections include first and second friction clamp assemblies 30,32 to which the drive wheel 26,28 are connected respectively.

The clamp assemblies 30,32 include tapered wedge members 114,116 which are frictionally clamped onto the drive axles 22,24 and to the tapered wall portions 132 of the hub members 118. The wedge members are forced into contact with the axles 22,24 and the tapered wall portions 132 by a plurality of threaded fasteners 128 which extend through the retainer plate 126, the hub member 118, and into the threaded holes 129 in the wedge members 114,116. The bearing cage 120 is connected to second end portions 78,82 of the first and second arm members 72,74, and the bearing assemblies 122,124 provide relative rotation between the bearing cage 120 and the other members of the clamp assemblies 30,32. When the threaded fasteners 128 are loosened, the frictional force between the wedge members 114,116 and the drive axles 22,24 is released and the clamp assemblies 30,32, including drive wheels 26,28, can be moved laterally to any other position on the drive axles 22,24. However, the connections between the support beam 46 and each roller frame assembly 36,38 must also be released before the clamp assemblies 30,32 can be moved, since the clamp assemblies 30,32 are connected to the roller frame assemblies 36,38 through the bearing cage and the arm members 72,74.

To release the connection between the support beam 46 and the roller frame assemblies 36,38, the threaded fasteners 112 are removed from the support beam 46 and the bracket assemblies 98,100. With the threaded fasteners 112 removed, the brackets 98,100, which are connected to the roller frame assemblies 36,38, can be moved to another lateral position on the support beam 46 until the holes in the plate 106 align with the mating holes 89 in the support beam 46. At this same time, the threaded fasteners 128 are threaded into the threaded holes 129 in the wedge members 114,!16 to again frictionally clamp the wedge members 114,116 against the drive axles 22,24 and against the tapered wall portions 132. The threaded fasteners 112 are then reconnected to the support beam 46 and the bracket assemblies 98,100. While the roller frame assemblies 36,38 are being adjusted, the vehicle must be supported in some manner to relieve the weight on the roller frame assembly being adjusted. This can be accomplished in several ways, including a lifting device supporting the rear axle and the front support beam 46.

Additional adjustability, to increase the gage width of the roller frame assemblies 36,38, is possible by reversing the similar roller frame assemblies side to side. This would position the arm members 72,74 and the clamp assemblies 30,32 to the inside and the drive wheels 26,28 to the outside.

Other aspects, objects and advantages of this invention can be obtained from a study of the drawings, the disclosure, and the appended claims.

I claim:
1. A track laying work vehicle, comprising:
   a main frame assembly having first and second opposed sides and a longitudinal centerline;
   an engine;

first and second roller frame assemblies, each having first and second end portions, and each positioned substantially parallel to the longitudinal centerline of the vehicle;

first and second drive axles, each rotatably connected to said engine;

first and second drive wheels, each rotatably connected to a respective drive axle;

first and second idler assemblies, each rotatably connected to a respective roller frame assembly;

first and second endless elastomeric track belts, each belt having an inner friction drive surface having a plurality of guide blocks, each belt encircling a respective roller frame assembly, idler assembly, and drive wheel;

a roller frame support beam having first and second end portions and a middle portion, said middle portion extending transverse to and beneath said main frame assembly and being connected to said main frame assembly;

first and second roller frame extensions, each having first and second end portions, each first end portions being connected to a respective second end portion of said first and second roller frame assemblies, and each second end portions being connected to a respective first and second drive axle;

first and second clamp assemblies, each releasably connected to a respective drive axle; and each of said first and second roller frame assemblies being releasably connectable to and moveable along a respective first and second end portion of the roller frame support beam.

2. The work vehicle, as set forth in claim 1, wherein each of said first and second drive wheels are connected to a respective clamp assembly.

3. The work vehicle, as set forth in claim 1, wherein each of said second end portions of said roller frame extensions are connected to a respective clamp assembly, said connections being the only connections between said second end portions of said roller frames and said vehicle.

4. The work vehicle, as set forth in claim 1, wherein each of said clamp assemblies includes a bearing assembly.

5. The work vehicle, as set forth in claim 1, wherein each of said first and second clamp assemblies are laterally moveable relative to a respective axle.

6. The work vehicle, as set forth in claim 1, wherein each of said drive wheels is connected to a respective drive axle at a position between said main frame and a respective roller frame extension.

7. The work vehicle, as set forth in claim 1, wherein said first and second end portions of said roller frame support beam have a plurality of first holes, said holes being arranged in a plurality of first preselected patterns.

8. The work vehicle, as set forth in claim 7, wherein said connections between said support beam and said first and second roller frame assemblies includes first and second brackets, each of said brackets having a plurality of second holes arranged in a second preselected pattern, said brackets being removably connectable to said support beam by a plurality of threaded fasteners, said threaded fasteners adapted to penetrate respective holes of said support beam and said brackets.

9. The work vehicle, as set forth in claim 1, including a plurality of belt guiding roller assemblies.

10. The work vehicle, as set forth in claim 1, wherein each of said first and second clamp assemblies includes first and second wedge members, a hub member having an internal cavity and a journal portion and adapted to receive said wedge members within said internal cavity, a bearing cage having an internal bore, first and second bearing assemblies positioned between said bearing cage bore and said hub member journal portion, a retainer plate, and means for connecting said hub member, said bearing cage, said wedges, and said retainer plate together.

11. The work vehicle, as set forth in claim 10, wherein each of said first and second drive wheels is connected to a respective hub member of said first and second clamp assemblies.

12. The work vehicle, as set forth in claim 1, wherein each of said first and second idler assemblies includes first and second spaced apart idler wheels.

13. The work vehicle, as set forth in claim 12, wherein said drive wheels have a diameter which is larger than the diameter of s id idler wheels.

14. The work vehicle, as set forth in claim 1, including first and second hanger assemblies, each being connected to a respective first and second side of said main frame, and to said middle portion of said support beam.

15. The work vehicle, as set forth in claim 14, wherein said hanger assemblies are removably connected to said main frame sides by a plurality of threaded fasteners.

16. The work vehicle, as set forth in claim 1, wherein each of said drive wheels includes a disk portion having a mounting surface, and a rim portion having an inwardly directed recess, said recess adapted to receive said guide blocks of said track belt.

17. The work vehicle, as set forth in claim 16, wherein said guide blocks have a height dimension "d" and said recess has a depth dimension "D" which is greater than said height dimension "d".

18. The work vehicle, as set forth in claim 16, wherein said rim portion includes a layer of elastomeric material bonded to said rim portion.

19. A work vehicle, comprising:

a main frame assembly having first and second spaced apart parallel side portions;

a power generating means;

first and second auxiliary frame assemblies, each having first and second end portions, and positioned parallel to and spaced from said first and second main frame side portions respectively;

first and second drive axles powered by said power generating means;

first and second drive wheels, each being rotatably connected to a respective drive axle;

first and second idler assemblies, each rotatably connected to a respective first end portion of said first and second auxiliary frame assemblies;

a plurality of guide rollers rotatably connected to said first and second auxiliary frame assemblies;

first and second endless track assemblies encircling respectively said first and second auxiliary frame assemblies, said first and second idler assemblies, said first and second drive wheels, and said guide rollers;

a rigid support beam having first and second end portions and a middle portion, said middle portion positioned beneath said main frame assembly;

first means for releasably connecting said middle portion of said support beam to said first and second main frame side portions;

second means for releasably connecting said first and second end portions of said support beam to a respective first end portion of said auxiliary frame assemblies;

first and second arm members, each having a first end portion connected to one of said auxiliary frame assemblies second end portion, and a second end portion releasably connected to one of said first and second drive axles; and first and second friction clamp assemblies, each being releasably connected to a respective drive axle.

20. The work vehicle, as set forth in claim 19, wherein said first connecting means includes first and second hanger assemblies, each being connected to said middle portion of said support beam and each releasably connected to a respective main frame side portion.

21. The work vehicle, as set forth in claim 19, wherein each of said first and second end portions of said support beam has a plurality of first mounting holes, said second connecting means includes first and second brackets, each having a plurality of second mounting holes, and a plurality of threaded fasteners adapted to penetrate said first and second mounting holes.

22. An undercarriage assembly for a vehicle, said vehicle having a main frame having first and second side portions, first and second powered drive axles, and a longitudinal centerline, said undercarriage assembly, comprising:

first and second roller frame assemblies, each positioned substantially parallel to the longitudinal centerline of the vehicle, each roller frame assembly including a plurality of guide rollers;

first and second drive wheels, each being rotatably connected to a respective drive axle;

first and second idler wheel assemblies, each rotatably connected to a respective roller frame assembly;

first and second friction clamp assemblies, each being releasably connectable to and moveable along a respective drive axle;

first and second arm members, each connected between a respective clamp assembly and a roller frame assembly;

a rigid support beam having first and second end portions and a middle portion, said middle portion positioned beneath said main frame and connected to said first and second main frame side portions;

means for releasably connecting said first and second end portions of said support beam respectively to said first and second roller frame assemblies, said means providing a plurality of connected positions between said support beam and said roller frame assemblies; and first and second endless track assemblies encircling respectively said first and second roller frame assemblies, said first and second drive wheels, and said first and second idler wheel assemblies.

* * * * *